United States Patent
Joshi et al.

(10) Patent No.: US 10,875,230 B2
(45) Date of Patent: Dec. 29, 2020

(54) GAS-ASSISTED BASE BLOW OFF METHODS FOR BLOW MOLDING APPLICATIONS

(71) Applicant: THE COCA-COLA COMPANY, Atlanta, GA (US)

(72) Inventors: Rohit Joshi, Alpharetta, GA (US); Ravi D. Mody, Johns Creek, GA (US)

(73) Assignee: THE COCA-COLA COMPANY, Atlanta, GA (US)

( * ) Notice: Subject to any disclaimer, the term of this patent is extended or adjusted under 35 U.S.C. 154(b) by 528 days.

(21) Appl. No.: 15/536,928

(22) PCT Filed: Dec. 16, 2015

(86) PCT No.: PCT/US2015/066050
§ 371 (c)(1),
(2) Date: Jun. 16, 2017

(87) PCT Pub. No.: WO2016/100484
PCT Pub. Date: Jun. 23, 2016

(65) Prior Publication Data
US 2018/0050482 A1 Feb. 22, 2018

Related U.S. Application Data

(60) Provisional application No. 62/094,498, filed on Dec. 19, 2014.

(51) Int. Cl.
*B29C 49/22* (2006.01)
*B29C 49/70* (2006.01)
(Continued)

(52) U.S. Cl.
CPC .............. *B29C 49/22* (2013.01); *B29C 49/70* (2013.01); *B29C 49/46* (2013.01); *B29C 49/58* (2013.01);
(Continued)

(58) Field of Classification Search
CPC ........ B29C 2049/701; B29C 2049/702; B29C 2049/705; B29C 2049/707;
(Continued)

(56) References Cited

U.S. PATENT DOCUMENTS 3,474,497 A * 10/1969 Watts, Jr. ................ B29C 33/46
425/404
4,808,105 A 2/1989 Linss et al.
(Continued)

FOREIGN PATENT DOCUMENTS

| JP | S60189418 A | 9/1985 |
| JP | H11348107 A | 12/1999 |
| JP | 2000343590 A | 12/2000 |

OTHER PUBLICATIONS

Woishnis, Chemical Resistance of Thermoplastics, 2012, Elsevier, pp. xliii-xliv (Year: 2012).*

(Continued)

*Primary Examiner* — Matthew J Daniels
*Assistant Examiner* — Andrew L Swanson
(74) *Attorney, Agent, or Firm* — Eversheds Sutherland (US) LLP

(57) ABSTRACT

This disclosure provides a method of manufacturing a polymer container according to a blow molding or stretch blow molding process, in which the base of the blow mold has at least one orifice for pressurized gas to enter the blow (Continued)

Figure 1:
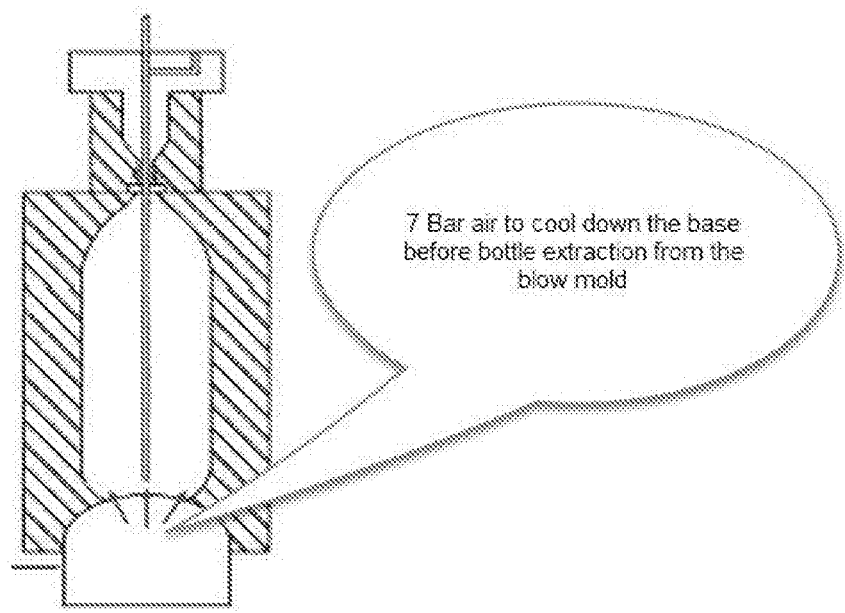

mold through the base. Introducing pressurized gas through the orifice in the blow mold base provides cooling assistance within the gas mold, much earlier than the cooling using conventional methods, which can reduce or eliminate the need for any post mold cooling. This method has been found to be applicable to non-hot fill application bottle and container manufacture.

14 Claims, 2 Drawing Sheets

(51) Int. Cl.
| | | |
|---|---|---|
| B29C 49/46 | (2006.01) | |
| B29K 67/00 | (2006.01) | |
| B29C 49/58 | (2006.01) | |
| B29C 49/66 | (2006.01) | |

(52) U.S. Cl.
CPC ...... *B29C 49/66* (2013.01); *B29C 2049/4608* (2013.01); *B29C 2049/4641* (2013.01); *B29C 2049/5803* (2013.01); *B29C 2049/5855* (2013.01); *B29C 2049/5889* (2013.01); *B29C 2049/6607* (2013.01); *B29C 2049/6653* (2013.01); *B29C 2049/6692* (2013.01); *B29C 2049/702* (2013.01); *B29K 2023/06* (2013.01); *B29K 2067/003* (2013.01)

(58) Field of Classification Search
CPC ............ B29C 2049/708; B29C 37/003; B29C 2049/6692; B29C 33/46; B29C 49/70; B29C 49/48
See application file for complete search history.

(56) References Cited

U.S. PATENT DOCUMENTS

| | | | | |
|---|---|---|---|---|
| 4,915,992 | A * | 4/1990 | Takakusaki | B29C 49/0073 |
| | | | | 428/36.92 |
| 5,585,125 | A | 12/1996 | Iizuka et al. | |
| 2004/0070119 | A1* | 4/2004 | Fibbia | B29C 49/12 |
| | | | | 264/531 |
| 2005/0073077 | A1* | 4/2005 | Whitley | B29C 49/541 |
| | | | | 264/523 |
| 2009/0130246 | A1* | 5/2009 | Tonga | B29C 33/46 |
| | | | | 425/537 |
| 2011/0298161 | A1* | 12/2011 | Chomel | B29C 49/4802 |
| | | | | 264/531 |
| 2012/0052148 | A1 | 3/2012 | Langlois | |

OTHER PUBLICATIONS

PCT International Search Report and Written Opinion for International Application No. PCT/US2015/066050 dated Apr. 1, 2016.
Supplemental European Search Report of European Application No. 15870967.5 dated Aug. 27, 2018.
Russo, Mario, "Polygonal Modeling: Basic and Advanced Techniques," Wordware Publishing, Inc., 2006, pp. 23-41.

\* cited by examiner

FIGURE 2
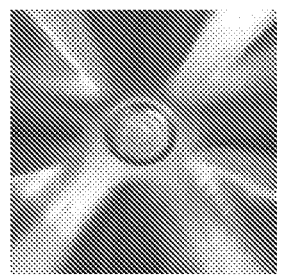 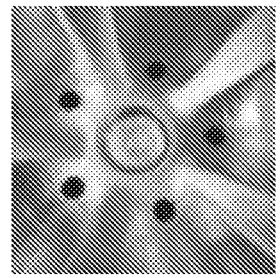
FIG. 2A
FIG. 2B

GAS-ASSISTED BASE BLOW OFF METHODS FOR BLOW MOLDING APPLICATIONS

CROSS REFERENCE TO RELATED APPLICATIONS

This application claims the benefit of priority of U.S. Provisional Patent Application No. 62/094,498, filed Dec. 19, 2014, which is incorporated by reference in its entirety and PCT Patent Application No. PCT/US2015/066050, filed Dec. 16, 2015 and published as WO 2016/100484, which is incorporated by reference in its entirety.

TECHNICAL FIELD

This disclosure relates to blow-molding and stretch blow-molding processes and apparatus, particularly for evacuation of the bottle from the mold.

BACKGROUND

Polyethylene terephthalate or "PET" polymers and co-polymers are widely used to manufacture bottles for beverages such as water, juices, carbonated soft drinks (CSD), and the like, because they generally possess good mechanical and gas barrier properties. Such bottles are conventionally prepared using a stretch blow molding process. Stretch blow molding first involves injecting the PET resin into a perform injection mold designed according to the desired final bottle shape and size and the PET polymer properties. The preform is subsequently stretch blow molded in which the heated perform is both blown and stretched into the final container shape using compressed air and an axial stretching rod.

One significant step in the stretch blow molding process is the removal of the final container from the mold. It is generally preferable to cool the blown container to a certain extent to assist in the extraction and to help maintain the integrity of the bottle during the removal process. Sufficiently cooling and removing the container from the mold can be difficult, particularly during high speed stretch blow molding operations. If removal conditions are not precise, the bottles can exhibit a substantial reduction in base clearance during high speed blow molding, particularly for stand-alone (non-combi/bloc) blow molding machines.

Therefore, improvements are needed in blow molding and stretch blow molding processes and machines, especially in the evacuation of the mold and removal of the bottle. This need is often seen during high speed stretch blow molding operations, where cooling of the blown container is helpful to aid in bottle extraction and to help maintain the integrity of the bottle base clearance. This need is further challenging due to the various PET resin compositions and properties that may be used in a blow molded or stretch blow molded machine, and the wide range of bottle weights and sizes that are produced in such operations. Therefore, new methods for cooling and extraction are needed that are preferably widely applicable to various machines and processes.

DESCRIPTION OF THE DISCLOSURE

The present disclosure provides, among other things, an air-assisted (or generally, gas-assisted) base blow off system, method, and apparatus within the base blow mold as a means to cool the blown bottle base before evacuation of the bottle from the mold. As a result, the present method reduces, minimizes, or eliminates the need to have any post-mold cooling. The present gas-assisted base blow off system, method, and apparatus are particularly useful for CSD applications, but have found utility in blow molding and stretch blow molding operations for water, juice, and other bottles and containers. Generally, the gas-assisted base blow off system and method described in this disclosure will be an air-assisted system and method for in-mold cooling. Moreover, the term "air-assisted" will be used as a general term for any gas-assisted method, unless the context requires otherwise. However, there are specialty applications of this process that can use nitrogen or any other suitable gas, to achieve a specific result such as minimizing oxidation of the hot blow molded bottle and the like.

In one aspect, the disclosure provides for a gas-assisted including air-assisted base blow off method and apparatus to cool a blown bottle base before bottle evacuation from the blow mold. This method and process addresses the problem of reduction in base clearance in bottles such as CSD and water bottles, especially during high speed blow molding for stand-alone (non-combi/bloc) blow molding machines. In conventional methods, a significant drop in base clearance (as designed Vs as blown) is observed during high speed blow molding, including blow molding of non-hot fill bottles, and this is generally mitigated by having cooling the bottle with either air or water post bottle extraction from the blow mold. The proposed method allows for cooling the base much earlier within the base mold and eliminates the need to post mold cooling. "High speed" in this context is generally used to describe a process that generates about 1800 bottles per mold per hour or higher.

In a further aspect, the gas-assisted base blow off method can be effected by introducing a pressurized gas such as air in the base blow mold before bottle evacuation/ejection from the mold. The pressurized gas used in the gas-assisted base blow off method has been unexpectedly discovered to improve the base clearance, which in turn improves the Environmental Stress Crack Resistance (ESCR) and the Thermal Stability of the bottle when produced according to the method. The pressurized gas cools the blown bottle base before bottle evacuation from the blow mold. Conventionally, the problems of how to release a non-hot fill application bottle from a mold in a manner that prevents the significant drop in base clearance during fabrication have been addressed by focusing on post mold cooling Vs in a mold cooling method. This prior approach has not completely resolved the problems of drop in base clearance. However, particularly for non-hot fill applications, the disclosed method addresses this problem with the benefit of improved Environmental Stress Crack Resistance (ESCR) as well as improved Thermal stability.

Various aspects and embodiments of this disclosure are illustrated in the drawings provided herein.

FIG. 1 provides an illustration in cross section of one aspect of this disclosure, showing the general concept of using pressurized gas (air) to cool down the base before bottle extraction from the blow mold is carried out.

FIG. 2 illustrates the following aspects of the disclosure:
FIG. 2A is a comparative example of a blow molding base with no gas (air) blow off; and
FIG. 2B is an example of aspects of the present disclosure, showing a blow molding base with the gas (air) blow off feature provided by the five (5) gas orifices (also referred to as openings, vents, holes, perforations, or slits) near the center of the base. These gas orifices provide the cooling assistance with pressured gas such as air plumbed through the base blow mold through the gas orifices.

Prior to the invention disclosed herein, mold cooling before bottle evacuation was not carried out or even considered possible, particularly for high speed operations, for non-hot fill applications. The current or conventional solutions cooled the bottle base either with water or air "post evacuation", once the bottle had been evacuated from the mold. Among the advantages of the method and apparatus presented in this disclosure is that the methods herein allow for stabilizing the base earlier in the process, and the present method is a much cleaner and easier solution to the problem. Further, because the variation in base clearance can be addressed by individual blow stations, the present solution is more sustainable.

In an aspect, the disclosed base blow off method can be effected by introducing a pressurized gas such as air in the base blow mold before bottle evacuation/ejection from the mold. The pressurized gas (air) generally can be at about 2 bar, about 3 bar, about 4 bar, about 5 bar, about 6 bar, about 7 bar, about 8 bar, about 9 bar, about 10 bar, about 11 bar, about 12 bar, about 13 bar, about 14 bar, about 15 bar, or about 16 bar. For example, the pressurized gas (air) generally can be at about 2-16 bar, about 3-12 bar, about 4-10 bar, at about 5-9 bar, about 6-8 bar, or about 6.5-7.5 bar. Pressurized gas at 7 bar also works well. Gas (air) at these pressures have been discovered to cool a blown bottle base before bottle evacuation from the blow mold.

In accordance with another aspect, the disclosed base blow off method can be effected by introducing a pressurized gas in the base blow mold to achieve various gas flow rates as needed, and measured, for example, after bottle evacuation. While not intending to be bound by any particular theory, it is estimated that the air flow rates (standard cubic feet per minute) after bottle evacuation will be approximately that shown in Table 1.

TABLE 1

Calculated air flow rates (20° C.) after bottle evacuation, as a function of orifice diameter.

| Calculation | Pressure (bar) | Flow Rate, 0.1 mm Dia. Orifice (Scfm) | Flow Rate, 3 mm Dia. Orifice (Scfm) |
| --- | --- | --- | --- |
| A | 2 | 0.0025 | 2.29 |
| B | 7 | 0.0041 | 3.71 |
| C | 16 | 0.006 | 5.43 |

Aspects of the disclosure are illustrated in FIG. 2B, where an embodiment of a blow molding base is shown with the gas blow off feature provided by the five (5) gas orifices or holes nearest the center of the base. The gas orifices provide the cooling assistance with pressured gas within the gas mold, much earlier than conventional methods, which can reduce or eliminate the need for any post mold cooling. In one aspect, the gas orifices can have a diameter of about 0.1 mm to about 3.0 mm. Alternatively, orifices can have a diameter of about 0.2 mm to about 2.0 mm, a diameter of about 0.2 mm to about 2.0 mm, or a diameter of about 0.5 mm to about 1.5 mm. Orifices having a diameter of about 1 mm also work well. In this aspect, suitable gas orifices can have a diameter of about 0.1 mm, about 0.2 mm, about 0.3 mm, about 0.4 mm, about 0.5 mm, about 0.6 mm, about 0.7 mm, about 0.8 mm, about 0.9 mm, about 1.0 mm, about 1.1 mm, about 1.2 mm, about 1.3 mm, about 1.4 mm, about 1.5 mm, about 1.6 mm, about 1.7 mm, about 1.8 mm, about 1.9 mm, about 2.0 mm, about 2.1 mm, about 2.2 mm, about 2.3 mm, about 2.4 mm, about 2.5 mm, about 2.6 mm, about 2.7 mm, about 2.8 mm, about 2.9 mm, or about 3.0 mm. It is not necessary that all the holes or gas orifices be the same size in a single blow molding base. Therefore, any combination of orifice sizes such as those set out herein can be used. For example, the orifices can have an average diameter of from about 0.1 mm to about 3.0 mm.

A further aspect of the disclosure is illustrated in FIG. 2B, where an embodiment of a blow molding base is shown with the positioning of the gas orifices or holes being equidistant from the center of the base. In an aspect, the location of the gas orifices of the blow molding base can be from about 2 mm to about 15 mm from the center of the base. It is not necessary that all the holes or gas orifices be located equidistant from the center of the blow molding base, because holes can be situated at different distances from the center. Thus, various combinations of distances from the center of the base can be used to locate the gas orifices. For example and not as a limitation, the gas orifices can located at about 2 mm from the center of the blow molding base. Alternatively, the gas orifices can located at about 3 mm, about 4 mm, about 5 mm, about 6 mm, about 7 mm, about 8 mm, about 9 mm, about 10 mm, about 11 mm, about 12 mm, about 13 mm, about 14 mm, or about 1.5 mm from the center of the blow molding base. Any combination of distances can be employed, which will typically be used when there are more holes in the blow molding base than the number of petals in a petaloid base blow mold.

One feature of the orifices or holes in the blow molding base according to this disclosure is that the shape of each orifice is not required to be round. Thus, any shape of an opening can be used, including any shape hole, vent, slit, or perforation, or any combination thereof. Thus, the orifice can be round, oval, triangular, square, rectangular, or generally any polygonal shape. Generally, it is desirable to achieve a certain gas (e.g. air) pressure at and flow through the combination of orifices and any shape or combination of shapes that can achieve the desired pressures and flow rates can be utilized.

In one aspect, while a single gas orifice can in theory be used to cool the container with pressured gas, in practice the number of gas orifices in the blow mold base will typically range from 2 to 20. Typically, though not always, the minimum number of gas orifices will be the same as the number of petals in a petaloid base blow mold. In the example of FIG. 2B, there are 5 orifices shown, but in the base design of FIG. 2B, even 2, 3, or 4 orifices would work. Further, the number of orifices can be any number, limited only by the area of the blow mold base and the need for a particular gas flow. For example, the number of gas orifices in the blow mold base can be 2, 3, 4, 5, 6, 7, 8, 9, 10, 11, 12, 13, 14, 15, 16, 17, 18, 19, or 20, or even more, as needed to achieve the desired performance from a particular base mold. Moreover, the number of gas orifices in the blow mold base can range between any of these numbers.

When pressurized gas is used in the gas-assisted base blow off method according to this disclosure, the Environmental Stress Crack Resistance (ESCR) of the bottle has been found to improve (see, for example, ASTM D883). In an aspect, the ESCR of a bottle made according to this disclosure with gas-assisted base blow off can show an improvement in ESCR of about 5%, about 10%, about 15%, about 20%, about 25%, about 30%, about 35%, about 40%, about 45%, or about 50%. Stress cracks are generally thought to initiate at microscopic imperfections and propagate through the crystalline regions of the polymer structure. It has been unexpectedly discovered that using the same polymer and same blow molding conditions except for the presence or absence of the gas-assisted base blow off, can show the improvements in ESCR as set out herein.

Generally, the various embodiments of this invention can be made with blow molding, the various methods of which are well known to the skilled person. In some aspects, the blow molding process comprises a preform reheat stretch blow molding process, as understood by the skilled person.

For example, in an embodiment, the preform can be placed in a blow molding apparatus having an upper mold section which engages the neck finish, a middle mold section having an interior cavity forming the shape of the container side wall, and a lower mold section having an upper surface forming the outwardly concave dome portion of the container base. It is this dome portion of the container base in which the gas orifices are situated, as illustrated in the Figures.

In some embodiments, the base material is PET copolymer that is used in accordance with a conventional reheat stretch blow mold process. In this aspect, the injection-molded preform is first reheated to a temperature suitable for stretching and orientation (e.g., 80° to 130° C.), placed in the blow mold, and an axial stretch rod is then inserted into the open upper end and moved downwardly to axially stretch the preform. Subsequently or simultaneously, an expansion gas is introduced into the interior of the preform to radially expand the shoulder, sidewall and base forming portions outwardly into contact with the interior surfaces of mold sections. The resulting blown container has the same neck finish with outer threads and lowermost neck flange as the preform. The remainder of the bottle undergoes expansion, although to varying degrees. One principal difference in conventional processes and the disclosed process is the use of a blow molding base with the gas (air) blow off feature provided by the gas orifices (openings, vents, holes, perforations, or slits) that provide the cooling with pressured gas such as air plumbed through the base blow mold through the gas orifices.

The particular polymers used in fabricating the containers and bottles according to this disclosure are generally thermoplastic polymers. In one aspect, the disclosed method includes the steps of providing preform for a container, stretch blow molding the preform, and cooling and removing the container from the blow mold by a gas-assisted base blow off using pressurized gas. Specifically, this disclosure provides in one aspect a method for making a polymer container, the method comprising:
  a) providing a preform, the preform comprising a thermoplastic polymer;
  b) at a temperature sufficient to plasticize the thermoplastic polymer, stretch blow molding the preform in a blow mold to form a container, wherein the base of the blow mold has at least one orifice for gas to enter the blow mold; and
  c) introducing pressurized gas through the at least one orifice in the blow mold base sufficient to cool and evacuate the container from the blow mold.

Generally, the base of the blow mold has a plurality of gas orifices sufficient to allow gas of an appropriate flow rate and pressure to permit sufficient cooling and evacuation to sustain high speed manufacturing operations.

The preform can be made from a variety of thermoplastic polymers, and in embodiments, the thermoplastic polymer can comprise or can be one or more polyesters. In some preferred embodiments, the thermoplastic polymer is or includes a polyethylene terephthalate copolymer. The thermoplastic polymer used in the preform can include various additives, if desired, for example, colorants, UV blockers, lubricants, slip agents, processing aids, oxidative stabilizers, thermal stabilizers, creep control agents, gas barrier additives, and the like, including any appropriate combinations thereof.

In embodiments, useful polyesters are those suitable for packaging carbonated or non-carbonated beverages and/or oxygen-sensitive beverages or food products. In this aspect, suitable polyesters include PET copolymers, polyethylene naphthalate (PEN), polyethylene isophthalate, glycol modified amorphous PET copolymer, (commercially known as PETG), diacid modified amorphous PET, and the like. PET copolymers are particularly useful because they are used in many container applications. As used herein, "PET copolymers" refers to those compositions that comprise a diol component having repeat units from ethylene glycol and a diacid component having repeat units from terephthalic acid. In various aspects and embodiments, the PET copolymer has less than about 20% diacid component modification and/or less than 10% diol component modification, based on 100 mole % diacid component and 100 mole % diol component.

Optionally, a multi-layer preform also may be used. For example, suitable preforms could comprise a 2-, 3-, 4-, or 5-layer, or generally any multi-layer structure, as understood by the person of ordinary skill. In this aspect, the different layers are distinguished by different polymer composition, different polymer properties, different additives, and generally differences in the chemical and physical properties. For example, in some aspects and embodiments, a 3-layer preform structure can be used in which the middle layer can comprise a barrier layer or can include a gas barrier additive, and the product-contacting layer and the external layer can be polyester layers.

In one aspect, the container is a bottle and in another aspect, the container is a bottle suitable for carbonated soft drink (CSD) packaging. In one embodiment, the bottle is generally cylindrical and includes a neck finish with outer threads, disposed between the open ended mouth and a capping flange. If desired, the container can further comprise an overmolded layer comprises an overmolding material.

In a further aspect, a packaged beverage is provided in accordance with this disclosure. In one embodiment for example, the packaged beverage includes a container body having an outer surface and an interior space, wherein the container body is formed by the stretch blow molding method disclosed herein using a thermoplastic polymer preform, and a beverage is disposed in the interior space of the container. The beverage can be any beverage such as water, juice, carbonated soft drinks, and the like.

In particular embodiments, the disclosed methods and apparatus are adapted for making containers for packaging applications in the carbonated and non-carbonated soft drink industry and the food industry. A common manufacturing method for forming these containers includes injection molding the container preforms, followed by making the containers from the preforms in single stage or two stage blow molding manufacturing systems. Such methods are well known to those skilled in the art, and examples of possible preform and container structures are disclosed, for example, in U.S. Pat. No. 5,888,598, the disclosure of which is incorporated herein by reference. Such methods may be readily adapted to accommodate the presence of the base with air (or gas) blow off, and the water and air (or gas) circuit base with air (or gas) blow off. In another embodiment, commercial equipment including the features according to this disclosure are encompassed herein.

Definitions

To define more clearly the terms used herein, the following definitions are provided, which are applicable to this disclosure unless otherwise indicated by the disclosure or the context. To the extent that any definition or usage provided by any document incorporated herein by reference conflicts with the definition or usage provided herein, the definition or usage provided herein controls.

The term "base clearance" or "clearance" is used to describe the distance from the center of the base in the preform gate area to the standing surface. Base clearance after thermal stability is the clearance after the bottle has been pressurized and has been subjected to the thermal stability test. Thus, base clearance after thermal stability is determined by pressurizing the bottle under conditions of high temperature and high humidity for 24 hours, and measuring the base clearance after the 24 hour period.

The term "high speed" operation to describe a blow molding or stretch blow molding process generally refers to a process that generates about 1800 bottles per mold per hour or higher, including when the operation is a blow molding of non-hot fill bottles.

Throughout this specification, various publications may be referenced. The disclosures of these publications are hereby incorporated by reference in pertinent part, in order to more fully describe the state of the art to which the disclosed subject matter pertains. The references disclosed are also individually and specifically incorporated by reference herein for the material contained in them that is discussed in the sentence in which the reference is relied upon. Again, to the extent that any definition or usage provided by any document incorporated herein by reference conflicts with the definition or usage applied herein, the definition or usage applied herein controls.

As used in the specification and the appended claims, the singular forms "a," "an," and "the" include plural referents, unless the context clearly dictates otherwise. Thus, for example, reference to "a projectile" includes a single projectile such as a slug, as well as any combination of more than one projectile, such as multiple pellets of shot of any size or combination of sizes. Also for example, reference to "a projectile" includes multiple particles of a chemical composition or mixture of compositions that constitutes a projectile, and the like.

Throughout the specification and claims, the word "comprise" and variations of the word, such as "comprising" and "comprises," means "including but not limited to," and is not intended to exclude, for example, other additives, components, elements, or steps. While compositions and methods are described in terms of "comprising" various components or steps, the compositions and methods can also "consist essentially of" or "consist of" the various components or steps.

"Optional" or "optionally" means that the subsequently described element, component, step, or circumstance can or cannot occur, and that the description includes instances where the element, component, step, or circumstance occurs and instances where it does not.

Unless indicated otherwise, when a range of any type is disclosed or claimed, for example a range of the particle sizes, percentages, temperatures, and the like, it is intended to disclose or claim individually each possible number that such a range could reasonably encompass, including any sub-ranges or combinations of sub-ranges encompassed therein. When describing a range of measurements such as sizes or weight percentages, every possible number that such a range could reasonably encompass can, for example, refer to values within the range with one significant figure more than is present in the end points of a range, or refer to values within the range with the same number of significant figures as the end point with the most significant figures, as the context indicates or permits. For example, when describing a range of percentages such as from 85% to 95%, it is understood that this disclosure is intended to encompass each of 85%, 86%, 87%, 88%, 89%, 90%, 91%, 92%, 93%, 94%, and 95%, as well as any ranges, sub-ranges, and combinations of sub-ranges encompassed therein. Applicants' intent is that these two methods of describing the range are interchangeable. Accordingly, Applicants reserve the right to proviso out or exclude any individual members of any such group, including any sub-ranges or combinations of sub-ranges within the group, if for any reason Applicants choose to claim less than the full measure of the disclosure, for example, to account for a reference that Applicants are unaware of at the time of the filing of the application.

Values or ranges may be expressed herein as "about", from "about" one particular value, and/or to "about" another particular value. When such values or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed therein, and that each value is also herein disclosed as "about" that particular value in addition to the value itself. In another aspect, use of the term "about" means ±20% of the stated value, ±15% of the stated value, ±10% of the stated value, ±5% of the stated value, or ±3% of the stated value.

In any application before the United States Patent and Trademark Office, the Abstract of this application is provided for the purpose of satisfying the requirements of 37 C.F.R. § 1.72 and the purpose stated in 37 C.F.R. § 1.72(b) "to enable the United States Patent and Trademark Office and the public generally to determine quickly from a cursory inspection the nature and gist of the technical disclosure." Therefore, the Abstract of this application is not intended to be used to construe the scope of the claims or to limit the scope of the subject matter that is disclosed herein. Moreover, any headings that are employed herein are also not intended to be used to construe the scope of the claims or to limit the scope of the subject matter that is disclosed herein. Any use of the past tense to describe an example otherwise indicated as constructive or prophetic is not intended to reflect that the constructive or prophetic example has actually been carried out.

Those skilled in the art will readily appreciate that many modifications are possible in the exemplary embodiments disclosed herein without materially departing from the novel teachings and advantages according to this disclosure. Accordingly, all such modifications and equivalents are intended to be included within the scope of this disclosure as defined in the following claims. Therefore, it is to be understood that resort can be had to various other aspects, embodiments, modifications, and equivalents thereof which, after reading the description herein, may suggest themselves to one of ordinary skill in the art without departing from the spirit of the present disclosure or the scope of the appended claims.

Further attributes, features, and embodiments of the present invention can be understood by reference to the following numbered aspects of the disclosed invention. Reference to disclosure in any of the preceding aspects is applicable to any preceding numbered aspect and to any combination of any number of preceding aspects, as recognized by appropriate antecedent disclosure in any combination of preceding aspects that can be made. The following numbered aspects are provided:

1. A method of manufacturing a polymer container, comprising:
   a) providing a preform, the preform comprising a thermoplastic polymer;
   b) at a temperature sufficient to plasticize the thermoplastic polymer, stretch blow molding the preform in a blow mold to form a container, wherein the base of the blow mold has at least one orifice for gas to enter the blow mold; and
   c) introducing pressurized gas through the at least one orifice in the blow mold base sufficient to cool and evacuate the container from the blow mold.

2. A method according to the preceding aspect, wherein the base of the blow mold has a plurality of orifices for gas to enter the blow mold.

3. A method according to any of the preceding aspects, wherein the pressurized gas is air or nitrogen.

4. A method according to any of the preceding aspects, wherein the pressurized gas is provided at a pressure of from about 2 bar to about 12 bar.

5. A method according to any of the preceding aspects, wherein the pressurized gas is provided at a pressure of about 7 bar.

6. A method according to any of the preceding aspects, wherein the at least one orifice has a diameter or an average diameter of from about 0.1 mm to about 3.0 mm.

7. A method according to any of the preceding aspects, wherein the at least one orifice of the blow molding base can be from about 2 mm to about 15 mm from the center of the base.

8. A method according to any of the preceding aspects, wherein the at least one orifice is round.

9. A method according to any of the preceding aspects, wherein the blow mold base is a petaloid base and the number or orifices in the blow mold base equals the number of petals in a petaloid base.

10. A method according to any of the preceding aspects, wherein the thermoplastic polymer is selected from polyethylene terephthalate (PET), polyethylene naphthalate (PEN), polyethylene isophthalate, glycol modified amorphous PET copolymer (PETG), and diacid modified amorphous PET.

11. A method according to any of the preceding aspects, wherein the preform comprises a multi-layer structure.

12. A method according to any of the preceding aspects, wherein the preform is an injection molded thermoplastic preform.

13. A method according to any of the preceding aspects, wherein the method is repeated at a sufficiently high rate generate about 1800 bottles per mold per hour or higher.

14. A method according to any of the preceding aspects, wherein the method produced a bottle having an improvement in Environmental Stress Crack Resistance (ESCR) of at least about 10%, as compared to a corresponding bottle produced in the absence of introducing pressurized gas through the at least one opening in the blow mold base.

15. A method according to any of the preceding aspects, wherein the container is a bottle suitable for carbonated soft drink (CSD).

16. A container prepared according to the method of any of the preceding aspects.

17. A packaged beverage, wherein the beverage is packaged in a container according to aspect 16.

What is claimed is:

1. A method of manufacturing a polymer container, comprising:
   a) providing a preform, the preform comprising a thermoplastic polymer;
   b) at a temperature sufficient to plasticize the thermoplastic polymer, stretch blow molding the preform in a blow mold to form a container, wherein the base of the blow mold has two or more orifices equidistant from and equally spaced around the center of the blow mold base for gas to enter the blow mold; and
   c) introducing pressurized gas through the two or more orifices in the blow mold base sufficient to cool the container base prior to container evacuation, and subsequently evacuate the container from the blow mold.

2. A method according to claim 1, wherein the base of the blow mold has 3, 4, 5, 6, 7, or 8 orifices for gas to enter the blow mold.

3. A method according to claim 1, wherein the pressurized gas is air or nitrogen.

4. A method according to claim 1, wherein the pressurized gas is provided at a pressure of from about 2 bar to about 12 bar.

5. A method according to claim 1, wherein the pressurized gas is provided at a pressure of about 7 bar.

6. A method according to claim 1, wherein the two or more orifices have a diameter or an average diameter of from about 0.1 mm to about 3.0 mm.

7. A method according to claim 1, wherein the two or more orifices of the blow mold base are located from about 2 mm to about 15 mm from the center of the base.

8. A method according to claim 1, wherein the blow mold base is a petaloid base and the number of orifices in the blow mold base equals the number of petals in a petaloid base.

9. A method according to claim 1, wherein the thermoplastic polymer is selected from polyethylene terephthalate (PET), polyethylene naphthalate (PEN), polyethylene isophthalate, glycol modified amorphous PET copolymer (PETG), and diacid modified amorphous PET.

10. A method according to claim 1, wherein the preform comprises a multi-layer structure.

11. A method according to claim 1, wherein the preform is an injection molded thermoplastic preform.

12. A method according to claim 1, wherein the method is repeated at a sufficiently high rate to generate about 1800 bottles per mold per hour or higher.

13. A method according to claim 1, wherein the method produced a bottle having an improvement in Environmental Stress Crack Resistance (ESCR) of at least about 10%, as compared to a corresponding bottle produced in the absence of introducing pressurized gas through the at least one opening in the blow mold base.

14. A method according to claim 1, wherein the container is a bottle suitable for carbonated soft drink (CSD).

* * * * *